US010544752B2

(12) United States Patent
Ardisana et al.

(10) Patent No.: US 10,544,752 B2
(45) Date of Patent: Jan. 28, 2020

(54) ALUMINUM FOAM CORE PISTON WITH COAXIAL LASER BONDED AEROGEL/CERAMIC HEAD

(71) Applicants: Hyundai Motor Company, Seoul (KR); Kia Motors Corporation, Seoul (KR)

(72) Inventors: Gregory Ardisana, Novi, MI (US); Lang Sui, Ann Arbor, MI (US); Steven Sherman, Seoul (KR); Edward Thai, Seoul (KR); Isaac Yeo, Ann Arbor, MI (US); Michael Hollis, Royal Oak, MI (US); Scott Ziolek, Ann Arbor, MI (US)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 153 days.

(21) Appl. No.: 15/650,291

(22) Filed: Jul. 14, 2017

(65) Prior Publication Data

US 2019/0017465 A1 Jan. 17, 2019

(51) Int. Cl.
| | |
|---|---|
| *F02F 3/12* | (2006.01) |
| *F02F 3/00* | (2006.01) |
| *F02F 3/28* | (2006.01) |
| *F02B 77/11* | (2006.01) |
| *F16J 1/01* | (2006.01) |
| *F02B 23/06* | (2006.01) |

(52) U.S. Cl.
CPC ............. *F02F 3/12* (2013.01); *F02B 77/11* (2013.01); *F02F 3/0084* (2013.01); *F02F 3/28* (2013.01); *F16J 1/01* (2013.01); *F02B 2023/0612* (2013.01); *F05C 2201/021* (2013.01); *F05C 2253/14* (2013.01)

(58) Field of Classification Search
CPC .... F16J 1/01; F02F 3/0084; F02F 3/12; F05C 2253/14
USPC ......................................................... 92/222
See application file for complete search history.

(56) References Cited

U.S. PATENT DOCUMENTS

| | | | | |
|---|---|---|---|---|
| 4,245,611 | A | | 1/1981 | Mitchell et al. |
| 4,526,616 | A | * | 7/1985 | Fennell .................. F16D 65/84 419/19 |
| 4,966,221 | A | | 10/1990 | Takasuga et al. |
| 6,422,129 | B1 | * | 7/2002 | Yokomachi ......... F04B 27/0878 92/153 |
| 7,153,337 | B2 | | 12/2006 | Takiguchi |

(Continued)

FOREIGN PATENT DOCUMENTS

| | | |
|---|---|---|
| JP | 2002543346 A | 12/2002 |
| JP | 2008202454 A | 9/2008 |
| KR | 101254150 B1 | 4/2013 |

*Primary Examiner* — Michael Leslie
(74) *Attorney, Agent, or Firm* — Brinks Gilson & Lione

(57) ABSTRACT

An insulated composite piston head that includes three or more layers is formed and used in a combustion engine. The first layer is an aluminum or aluminum alloy foam core. The second layer is a metal layer that at least partially encapsulates the foam core; wherein the metal layer is selected to be aluminum or an aluminum alloy. The third layer is a layer of an insulating material located on at least one surface of the metal layer. The deposition of the insulating layer is accomplished via the use of a coaxial laser process.

20 Claims, 4 Drawing Sheets

(56) References Cited

U.S. PATENT DOCUMENTS

2002/0096046 A1\* 7/2002 Drexler .................... F16J 1/01
                                                                       92/208

\* cited by examiner

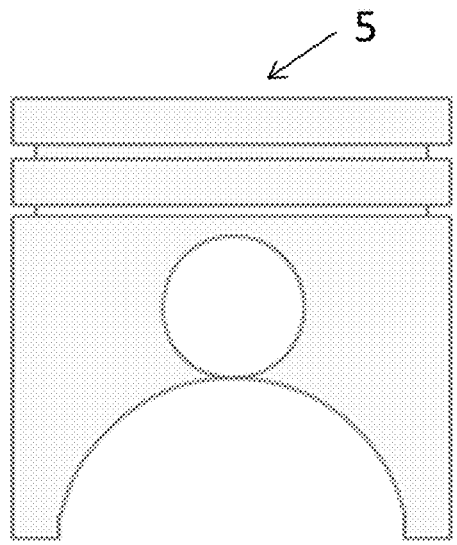
Figure 1A
(Conventional)

ALUMINUM FOAM CORE PISTON WITH COAXIAL LASER BONDED AEROGEL/CERAMIC HEAD

FIELD

This disclosure relates generally to a method of producing aluminum alloy castings and to pistons formed therefrom. More specifically, this disclosure relates to insulated piston heads used in internal combustion engines that have composite body constructions.

BACKGROUND

The statements in this section merely provide background information related to the present disclosure and may not constitute prior art.

Although piston and engine technology is fairly well developed, small incremental improvements are key to making a better engine. For example, engines that incorporate aluminum or an aluminum alloy have been widely employed in recent years in order to reduce the weight of and/or improve the heat release from internal combustion engines. However, aluminum or aluminum alloys are inferior to conventional cast iron in their mechanical strength when exposed to high temperatures.

The surface strength of an aluminum alloy casting may be enhanced by casting an aluminum alloy around a metal insert of a different metal by gravity casting or die casting. However, a molten aluminum alloy cannot be bonded to the surface of a metal insert with the sufficient strength to avoid the occurrence of de-bonding and/or cracking during use. In the case of die casting, although bond strength and packing density are improved, it is difficult to prevent blistering caused by the expansion of entrapped air upon heat treatment. In addition, the use of a porous metal body or insert provides a piston head that exhibits relatively low strength. The low density of a porous metal body can cause cracks to be readily generated when attempting to form a predetermined shape in the casting operation.

Various attempts have been made to provide engine piston heads with insulation through the use of ceramic coatings, ceramic inserts, or air gaps. The purpose(s) for providing such insulating means may include raising combustion temperatures, reducing heat losses, improving engine efficiency, reducing wall quenching, and/or reducing undesirable exhaust emissions. Generally, however, insulated piston designs have not been found satisfactory because they are difficult or incapable of being manufactured, exhibit inadequate durability, or lack the level of insulation necessary to control heat flow.

SUMMARY

The present disclosure generally provides an insulated composite piston head for use in a combustion engine. The piston head comprises a metallic foam core; a metal layer that at least partially encapsulates the foam core; and a layer of an insulating material located on at least one surface of the metal layer. When desirable, the piston head may further comprise a lubricious piston coating on at least a portion of the outer surface of the insulated composite piston head. This lubricious piston coating may be comprised of, but not limited to a silicone or a polytetrafluoroethylene, such as Teflon®.

The metal layer may be comprised of aluminum, an aluminum alloy, or a mixture thereof. The metal layer may exhibit a thickness that is on the order of about 4 mm or more.

The insulating material may be an aerogel, a ceramic material, or a mixture thereof. Alternatively, the insulating material may comprise an aerogel that is encapsulated by a ceramic or aluminum shell. The insulating material layer may exhibit a thickness up to about 1 mm.

The metallic foam core may be comprised of an aluminum or aluminum alloy. The porosity of the metallic foam core may be between about 20% to about 50%.

According to another aspect of the present disclosure, a method of forming an insulated composite piston head is provided. This method generally comprises: creating a preformed aluminum or aluminum alloy foam core; suspending the preformed foam core in a piston head mold; injecting or casting molten aluminum or an aluminum alloy into the mold through gates or traps to form a metallic layer that at least partially encapsulates the foam core, thereby, forming a molded piston head; removing the molded piston head from the mold with subsequent removal of any excess material attached thereto arising from the gates or traps; depositing an insulating material on at least one surface of the molded piston head; performing at least one final machining operation on the molded piston head such that the molded piston head conforms to a predetermined specification for the insulated composite piston head; and optionally, applying a lubricious piston coating to at least a portion of the outer surface of the insulated composite piston head.

The insulating material may be applied using a coaxial laser deposition process. This coaxial laser deposition process may comprise: providing a high pressure gas source; placing a metal powder in a feeder container; placing a molded piston head into a closed chamber; allowing the high pressure gas to force the metal powder from the feeder through a spray nozzle onto a surface of the molded piston head that is in the closed chamber; using a coaxial laser to fuse the powder that is applied to the surface of the molded piston head; and removing excess powder from the closed chamber.

When desirable, the coaxial laser deposition process may further comprise rotating the molded piston head and indexing the coaxial laser and spray nozzle using a robotic arm and a pyrometer to control the temperature of the surface on the molded piston head. The coaxial laser deposition process may also comprise the use of a separator to isolate excess metal powder that can be reused by mixing the excess metal powder with the metal powder in the feeder container.

According to yet another aspect of the present disclosure, a combustion engine is provided that incorporates one or more insulated composite piston heads defined above and further described herein. In this combustion engine, the piston head defines a longitudinal axis and opposing first and second ends. The metal layer encapsulates the foam core at the first end, and wherein the layer of insulating material covers the metal layer at the first end. When desirable, the metal layer does not have to encapsulate the foam core at the second end. The piston heads used in such a combustion engine may be formed according to the method described within the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1A is a schematic cross-sectional view of a conventional piston head;

Figure 1B:
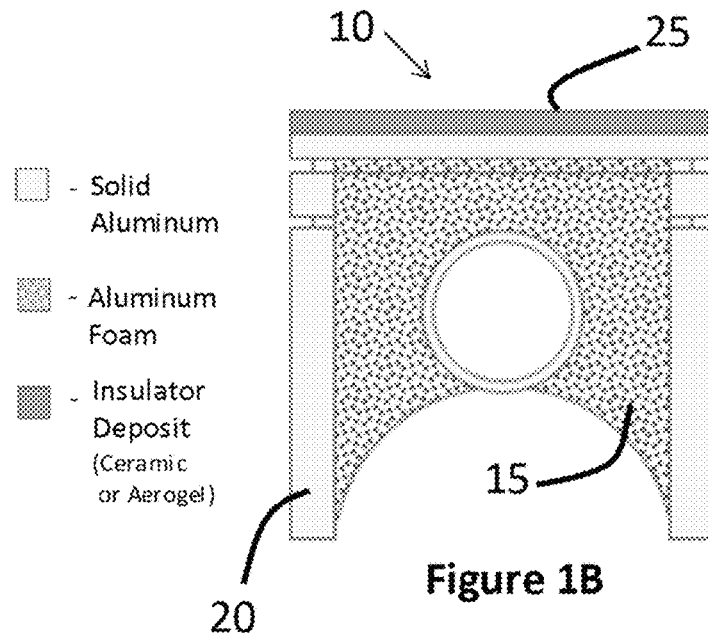
FIG. 1B is a schematic cross-sectional view of a piston head formed according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure generally provides an insulated composite piston head. In comparison to a conventional piston head 5 made of solid aluminum as shown in FIG. 1A, the composite piston head 10 of the present disclosure comprises at least three different and distinct layers as shown in FIG. 1B. These three layers include a metallic foam core 15; a metal layer 20 that at least partially encapsulates the foam core 15; and a layer of an insulating material 25 located on at least one surface of the metal layer 20.

An insulated composite piston head 10 as formed herein is lighter than a conventional piston head 5 and has better insulating properties, which result in the ability to achieve higher combustion chamber temperatures in an engine. The more energy that is maintained within the combustion chamber enhances the efficiency of the engine. Reducing the mass of the piston, while maintaining the structural integrity therewith, results in lower rotational inertia and less energy wasted during the operation of the engine. In addition to lightweight properties, the porosity of the metallic foam traps oil from the crankcase, which may assist in cooling the composite piston head during use.

Depending on the porosity of the metallic foam, a weight reduction of about 20-30% in non-structural aluminum and a fuel economy increase can be expected. This fuel economy increase results from the reduction of waste heat through the piston, and the reduced time to heat the engine oil in the crack case upon start-up. By maintaining higher temperatures in the combustion chamber, other "lean combustion" technology may become enabled, which will also have a significant impact on fuel economy.

Figure 2:
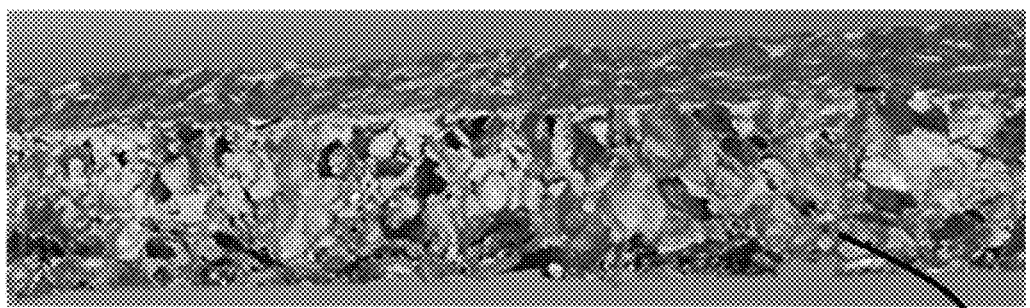
FIG. 2 is a cross-sectional view of an aluminum alloy foam used to shape a metallic foam core for the composite piston head formed according to the teachings of the present disclosure.

According to one aspect of the present disclosure, a porous metal core suitable for reinforcing a light metal or metal alloy is provided. Alternatively, the metal may be without limitation aluminum, while the metal alloy is an aluminum alloy. The porous metal core may be foam made from a metal including without limitation nickel, copper, iron, aluminum, or alloys of such metals. Alternatively, the metal foam 15 is an aluminum foam or aluminum alloy foam as shown in FIG. 2. When a metal layer is formed around the porous foam core 15 by a process, such as die casting, in which the molten metal introduced into the die is permitted to solidify under pressure, the pores in the foam core become filled with the solidified metal.

The foam core may have any predetermined shape determined by the specification desired for the insulated composite piston head. The metallic foam core has a cellular structure comprising solid metal in which a large portion of the volume is composed of gas-filled pores. The foam may be open-celled foam in which the pores are interconnected or closed-cell foam in which the pores are sealed. Alternatively, the metallic foam is open-celled foam. The pore size in the foam may be in the range of about 0.05 to about 1 mm, alternatively, greater than about 0.1 mm. The metallic foam exhibits porosity in the range of about 10% to about 70%, alternatively, between about 20% and 50%, alternatively, between about 25% and about 45%.

The metallic foam may be stochastic in which the porosity is randomly distributed. The structure of the foam may be regular or ordered when necessary or desired. The foam may be prepared by any method known in the art including, but not limited to foaming of liquid or powder metal, vapor deposition on a random matrix, direct or indirect random casting of a mold containing beads or matrix, or selective laser melting (SLM). When desirable, the metallic foam may be a composite foam material that comprises hollow metallic beads dispersed within a solid matrix of the same or different metal.

Although the porous metal foam core is lightweight by nature, it exhibits high strength. The porous metal foam also exhibits an ability to be impregnated with a lightweight metal or metal alloy, such as aluminum or an aluminum alloy. The porous metal structure body can be used to reinforce a lightweight metal layer by being at least partially encapsulated within said metal layer; alternatively the foam core is substantially encapsulated within said metal layer. The metal layer may be applied by casting or molding processes. Metal parts formed by encapsulating the metallic foam core are relatively stiff, fire resistant, nontoxic, recyclable, energy absorbent, less thermally conductive, less magnetically permeable, and more efficiently sound dampening, especially when compared to hollow parts.

The metal layer that at least partially encapsulates the metallic foam core may be formed on the porous metallic foam by casting, molding, or a similar process. The metal layer may be the same metal or metal alloy as that used in forming the metallic foam core. Alternatively, the metal layer may comprise a metal or metal alloy that is different than the metal or metal alloy used to form the metallic foam core. When desirable, the metal layer is aluminum or an aluminum alloy. The thickness of the metal layer may range from about 0.05 mm to about 6 mm; alternatively greater than 1 mm; alternatively less than 6 mm.

The purpose of the insulation layer is to stop heat propagation and loss through the piston, allowing more combustion energy to be captured as work. Tuning of the material properties for each specific application can be done as needed during production. The addition of an insulating layer on top of the metal layer helps in trapping heat in the combustion chamber, resulting in more work being done during the engine's power stroke. The presence of this heat allows the oil in the system to warm-up more quickly, while trapping more heat in the combustion chamber. The oil warms up quicker due to the increased surface area of the underside of the piston resulting in more heat transfer to the crank case upon start-up.

The insulating material may be a ceramic material, an aerogel, or a combination thereof. The aerogel may generally comprise, without limitation silica, carbon, or metal oxides, including but not limited to alumina, vanadia, chromia, titania, zirconia, or iron oxides. An aerogel is a porous ultralight material derived from a gel in which the liquid component of the gel has been replaced with a gas. The aerogel is a solid that has extremely low density and exhibits low thermal conductivity. The thickness of the insulating layer applied at a single time may range from about 0.05 mm to about 1 mm; alternatively, between about 0.1 mm to about 0.9 mm; alternatively, greater than about 0.2 mm. One skilled in the art will understand that a thicker insulation layer may be applied when needed by performing the deposition process a second time, which results in the application of an additional insulation layer made of the same or different material; alternatively, the same material.

Figure 3:
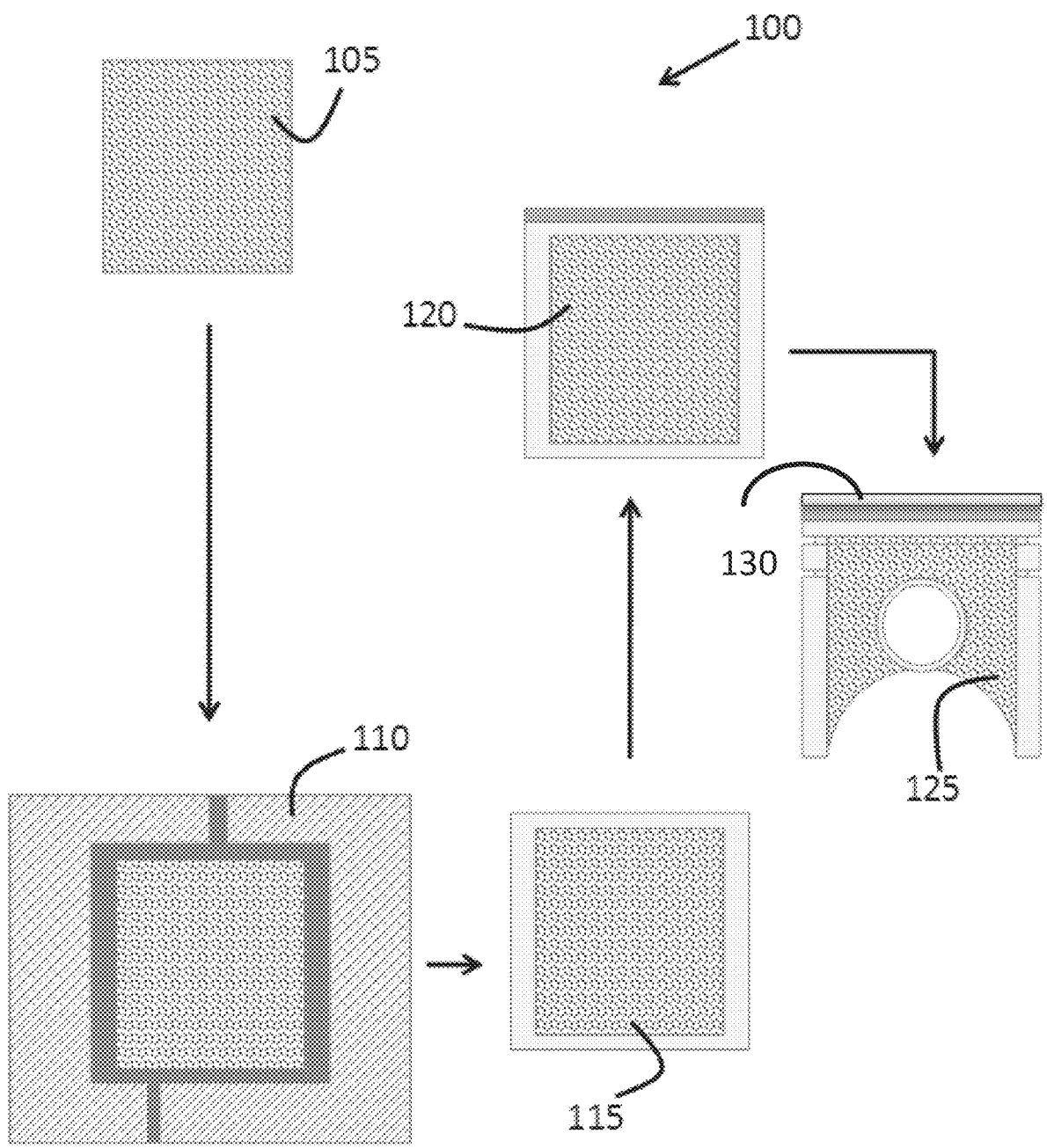
FIG. 3 is a schematic representation of a method for forming the insulated composite piston head of FIG. 1B.

Referring now to FIG. 3, a process 100 for manufacturing the insulated composite piston head is described. This process 100 may be optimized to reduce waste and cycle time as desired. The process 100 generally comprises creating 105 a preformed metallic foam core (e.g., aluminum or an aluminum alloy foam); suspending 110 the preformed foam core in the piston head mold, and injecting or casting molten aluminum into the mold around the foam core. The molten aluminum will partially melt the "skin" of the metallic foam core and seep into the pores creating a metallurgical and mechanical bond between the surfaces. Then, the step of removing 115 any gates and traps from the molding process is performed. The desired thickness of insulating material is then sprayed 120 on at least one surface of the metal layer. Alternatively, the insulating layer is formed on the top of the piston head. The deposition of the insulation layer uses a coaxial laser deposition technique. The deposition of the insulation layer is followed by the final machining 125 of the insulated composite piston head to meet the required final part specification. Optionally, a lubricious piston coating spray 130 may be applied to the surface of the insulated composite piston head as desired or required by the specification. Several examples of such a lubricious coating include, without limitation, a silicone material or a polytetrafluoroethylene, such as Teflon® (a registered trademark of the Chemours Company, Wilmington, Del.).

Figure 4:
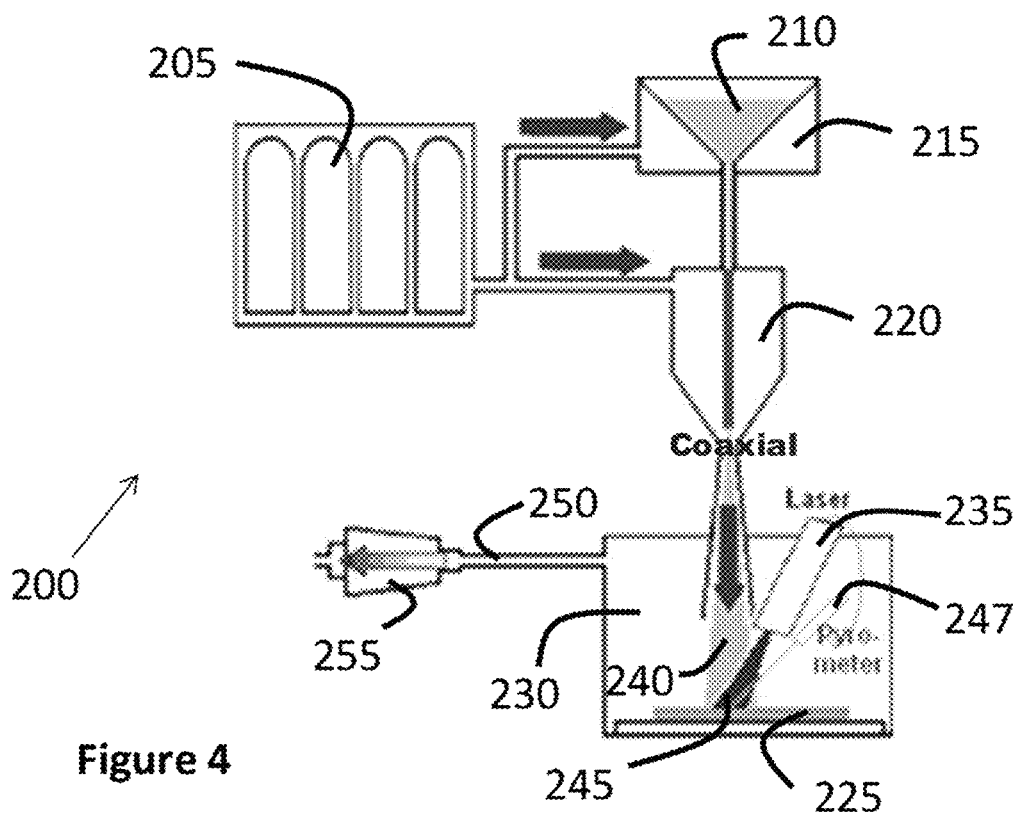
FIG. 4 is a schematic representation of coaxial laser deposition process that may be used to apply the insulation material to the surface of the piston head in the method of FIG. 3.

The bond created between the metal layer and the insulation material upon the deposition of the insulating layer using a coaxial laser results in the ability to use more delicate materials that cannot withstand a heated deposition process. The use of a coaxial laser deposition process allows for the deposition of a ceramic top coat or layer to be applied on to the metallic layer of the composite piston head without cracking or poor adhesion A coaxial spray laser provides the basic framework for depositing the insulating layer. Referring now to FIG. 4 a schematic of the coaxial layer process 200 is provided. High-pressure gas 205 forces the select metal powder 210 from a feeder 215 through a spray nozzle 220 onto the surface of a substrate (e.g., the composite piston head) 225 that is located in a closed environmental chamber 230. The coaxial laser 235 tracks the spray 240 and fuses 245 the applied powder onto the surface, while only heating the powder and the outermost surface of the metal layer of the composite piston head 225. The piston head 225 may be rotated while the laser 235 and spray nozzle 220 are indexed using a robotic arm (not shown) and a pyrometer 247 to control the surface temperature. The excess powder is evacuated 250 out of the chamber 230 for efficient reuse, using a separator 255.

The coaxial laser deposition process, which may also be called a method of laser cladding, is a process in which a gas propelled flow of metallic powder is melted and fused to a substrate through the use of a high energy laser beam. The ability of the deposited layer or coating to bond to the surface upon which it is deposited depends on various processing conditions, such as laser power, flow rate of powder material, heating of the substrate and powder, stream shape, and position of substrate. This technique allows for the deposition of thick protective coatings on substrates. The process can be described as an addition of one material by cladding on the surface of the substrate, where the heat source is a high power laser beam.

Figure 5:
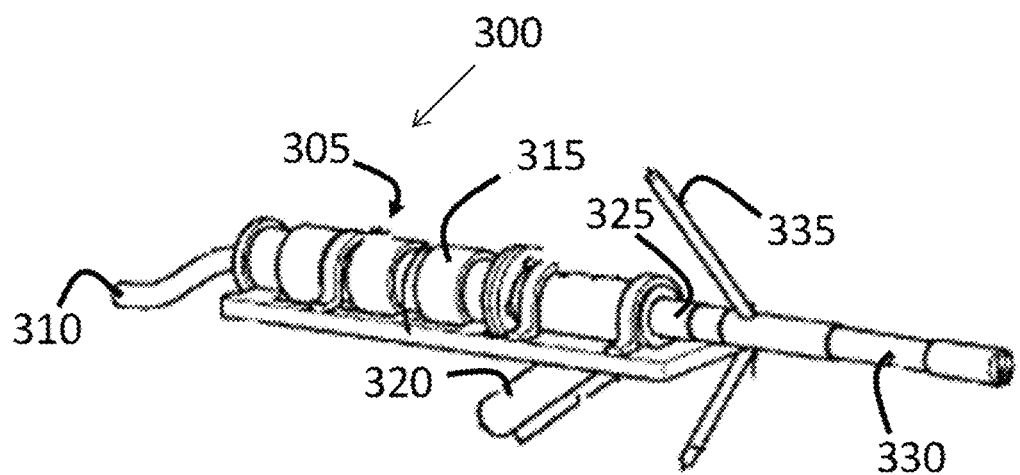
FIG. 5 is a perspective view of a schematic representation depicting a coaxial laser assembly as used in the process of FIG. 4.

Referring now to FIG. 5, a coaxial laser 300 assembly comprises a laser 305 of any suitable type, such as a diode laser. The laser 305 may include a fiber-optic cable 310 and at least one or more lenses 315. The laser 305 is operably coupled to the main gas inlet 320. The coaxial laser 300 emits a laser that is transmitted through convergent 325 and divergent 330 sections of the nozzle. The coaxial laser assembly 300 also includes a means of supplying particles to inner passage of the nozzle 325, 330 via one or more inlets 335.

Figure 6:
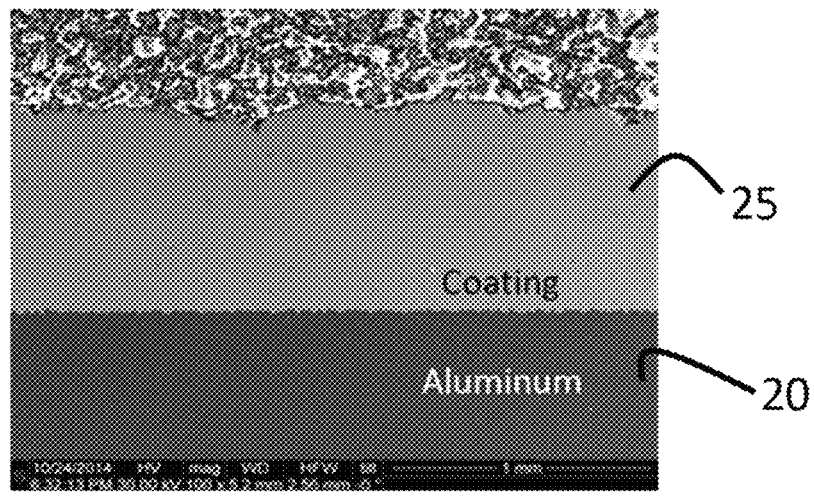
FIG. 6 is a micrograph showing a cross-sectional view of an insulation material applied to an aluminum layer using the coaxial laser deposition process of FIG. 4.

The above technique has been used to successfully bond various types of metals and ceramics without causing distortion or cracking to the underlying metal material. The insulation layer or deposited coating is able to be applied in 1 mm thickness without issue. Referring now to FIG. 6, microscopic examination of the boundary layer between a metal layer and the insulation layer shows direct metallurgical bonding, without the formation of an alloy.

Figure 7:
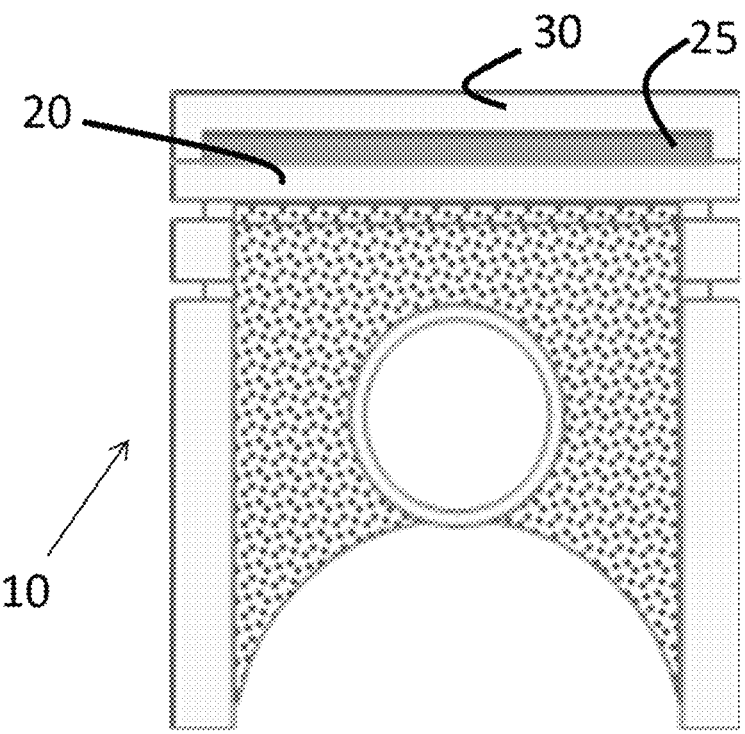
FIG. 7 is a schematic cross-sectional view of another piston head formed according to the teaching of the present disclosure.

Referring now to FIG. 7, the insulation layer may be applied as a two-part spray deposition process. In this case, a ceramic or aluminum shell 30 may be applied that over the top of the insulation layer 25, thereby encapsulating the aerogel. The encapsulation of the aerogel will further reduce the wear associated with and maintain the insulating properties of the insulated piston head over its useful lifetime.

According to another aspect of the present disclosure, a combustion engine is provided that incorporates one or more of the insulated composite piston heads defined above or formed according to the method described herein. In this combustion engine, the piston head defines a longitudinal axis and opposing first and second ends. The metal layer may encapsulate the foam core at the first end. In addition, the layer of insulating material may cover the metal layer at the first end. When desirable, the metal layer does not have to encapsulate the foam core at the second end.

Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

Within this specification, embodiments have been described in a way which enables a clear and concise specification to be written, but it in intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An insulated composite piston head for use in a combustion engine; the piston head comprising:
   an aluminum or aluminum alloy foam core;
   a metal layer that at least partially encapsulates the foam core; the metal layer comprising aluminum or an aluminum alloy; and
   a layer of an insulating material located on at least one surface of the metal layer;
   wherein the insulating material is an aerogel, a ceramic material, or a mixture thereof, and
   wherein the insulting material comprises an aerogel that is encapsulated by a ceramic or aluminum shell.

2. The composite piston head according to claim 1, wherein the metal layer has a thickness of about 4 mm or to about 6 mm.

3. The composite piston head according to claim 1, wherein the piston head further comprises a lubricious piston coating on at least a portion of the outer surface of the insulated composite piston head.

4. The composite piston head according to claim 3, wherein the lubricious piston coating is a silicone or polytetrafluoroethylene.

5. A combustion engine that incorporates one or more insulated composite piston heads according to claim 1.

6. The combustion engine according to claim 5, wherein the piston head defines a longitudinal axis and opposing first and second ends, and wherein the metal layer encapsulates the foam core at the first end, and wherein the layer of insulating material covers the metal layer at the first end.

7. The combustion engine according to claim 6, wherein the metal layer does not encapsulate the foam core at the second end.

8. An insulated composite piston head for use in a combustion engine, the piston head comprising:
   an aluminum or aluminum alloy foam core;
   a metal layer that at least partially encapsulates the foam core; the metal layer comprising aluminum or an aluminum alloy;
   a layer of an insulating material located on at least one surface of the metal layer; and
   an insulating material layer with a thickness that is about 1 mm or less.

9. The composite piston head according to claim 8, wherein the insulating material is an aerogel, a ceramic material, or a mixture thereof.

10. The composite piston head according to claim 9, wherein the insulating material comprises an aerogel that is encapsulated by a ceramic or aluminum shell.

11. The composite piston head according to claim 8, wherein the metal layer has a thickness of about 4 mm or more.

12. The composite piston head according to claim 8, wherein the foam core has a porosity that is between about 20% to about 50%.

13. The composite piston head according to claim 8, wherein the piston head further comprises a lubricious piston coating on at least a portion of the outer surface of the insulated composite piston head.

14. The composite piston head according to claim 13, wherein the lubricious piston coating is a silicone or polytetrafluoroethylene.

15. An insulated composite piston head for use in a combustion engine, the piston head comprising:
   an aluminum or aluminum alloy foam core;
   a metal layer that at least partially encapsulates the foam core; the metal layer comprising aluminum or an aluminum alloy; and
   a layer of an insulating material located on at least one surface of the metal layer; wherein the foam core has a porosity that is between about 20% to about 50%.

16. The composite piston head according to claim 15, wherein the insulating material is an aerogel, a ceramic material, or a mixture thereof.

17. The composite piston head according to claim 16, wherein the insulating material comprises an aerogel that is encapsulated by a ceramic or aluminum shell.

18. The composite piston head according to claim 15, wherein the metal layer has a thickness of about 4 mm or more.

19. The composite piston head according to claim 15, wherein the insulating material layer exhibits a thickness that is about 1 mm or less.

20. The combustion engine according to claim 15, wherein the piston head defines a longitudinal axis and opposing first and second ends, and wherein the metal layer encapsulates the foam core at the first end, and wherein the layer of insulating material covers the metal layer at the first end, and wherein the metal layer does not encapsulate the foam core at the second end.

* * * * *